US012479363B2

(12) United States Patent
Mossey et al.

(10) Patent No.: US 12,479,363 B2
(45) Date of Patent: Nov. 25, 2025

(54) REAR DISPLAY ENHANCEMENTS

(71) Applicant: Rivian IP Holdings, LLC, Irvine, CA (US)

(72) Inventors: Mary Elizabeth Mossey, Costa Mesa, CA (US); Philipp Josef Wolf, Dana Point, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 192 days.

(21) Appl. No.: 18/155,717

(22) Filed: Jan. 17, 2023

(65) Prior Publication Data

US 2024/0239265 A1  Jul. 18, 2024

(51) Int. Cl.
*B60R 1/00* (2022.01)
*B60R 1/06* (2006.01)
*B60R 1/26* (2022.01)
B60R 1/12 (2006.01)
B60R 11/00 (2006.01)

(52) U.S. Cl.
CPC .............. *B60R 1/002* (2013.01); *B60R 1/06* (2013.01); *B60R 1/26* (2022.01); *B60R 2001/1215* (2013.01); *B60R 2001/1253* (2013.01); *B60R 2011/0007* (2013.01); *B60R 2011/0012* (2013.01); *B60R 2300/105* (2013.01); *B60R 2300/303* (2013.01)

(58) Field of Classification Search
CPC .. B60R 1/002; B60R 1/06; B60R 1/26; B60R 2001/1215; B60R 2001/1253; B60R 2011/0007; B60R 2011/0012; B60R 2300/105; B60R 2300/303; B60R 1/29
See application file for complete search history.

(56) References Cited

U.S. PATENT DOCUMENTS

| 4,908,611 | A | * | 3/1990 | Iino | ................ | G02B 27/0101 |
| | | | | | | 359/13 |
| 6,494,527 | B1 | * | 12/2002 | Bischoff | ................ | B60R 11/02 |
| | | | | | | 348/E5.128 |
| 11,318,887 | B1 | * | 5/2022 | Zeng | ................ | H04N 7/181 |
| 2003/0234550 | A1 | * | 12/2003 | Brooks | ................ | B60R 1/29 |
| | | | | | | 296/24.46 |
| 2005/0046584 | A1 | * | 3/2005 | Breed | ................ | G06F 3/0237 |
| | | | | | | 340/13.31 |
| 2007/0222769 | A1 | * | 9/2007 | Otsuka | ................ | G06F 3/04883 |
| | | | | | | 345/173 |
| 2008/0143835 | A1 | * | 6/2008 | Abe | ................ | B60R 1/27 |
| | | | | | | 348/E7.086 |
| 2009/0284598 | A1 | * | 11/2009 | Busch | ................ | B60R 1/28 |
| | | | | | | 348/148 |

(Continued)

*Primary Examiner* — Timothy R Newlin
(74) *Attorney, Agent, or Firm* — Patterson + Sheridan, LLP

(57) ABSTRACT

A system includes a plurality of cameras, a first display, a second display, and at least one processor. The plurality of cameras includes a first camera positioned on an exterior of a vehicle. The first camera captures a first video. The first display is integrated into the vehicle and positioned proximate to a driver's seat. The second display is integrated into the vehicle and positioned proximate to a rear passenger seat. The at least one processor executes instructions to identify a first context of the vehicle or a rear passenger and provide, on the second display and based on the first context, a first image from the first video.

20 Claims, 9 Drawing Sheets

(56) References Cited

U.S. PATENT DOCUMENTS

| | | | |
|---|---|---|---|
| 2013/0016209 A1* | 1/2013 | Taylor | B60Q 9/00 |
| | | | 348/118 |
| 2013/0229519 A1* | 9/2013 | Kavuru | B60R 11/04 |
| | | | 348/148 |
| 2013/0292959 A1* | 11/2013 | West | B60R 1/04 |
| | | | 296/1.11 |
| 2015/0291093 A1* | 10/2015 | Iwai | B60K 35/00 |
| | | | 340/995.27 |
| 2015/0336673 A1* | 11/2015 | Hommel | B64D 11/0015 |
| | | | 297/217.3 |
| 2017/0066375 A1* | 3/2017 | Kato | G06V 20/58 |
| 2017/0315771 A1* | 11/2017 | Kerr | B60R 1/28 |
| 2017/0357271 A1* | 12/2017 | Büschenfeld et al. | |
| | | | G05D 1/0253 |
| 2020/0391693 A1* | 12/2020 | Kang | B60N 2/274 |
| 2020/0410406 A1* | 12/2020 | Leary | G05D 1/249 |
| 2021/0024000 A1* | 1/2021 | Peterson | H04N 7/188 |
| 2021/0213889 A1* | 7/2021 | Yoshizaki | H04N 23/57 |
| 2021/0235141 A1* | 7/2021 | Murphy | H04W 4/029 |
| 2022/0185479 A1* | 6/2022 | Bender | B60R 1/29 |
| 2022/0242316 A1* | 8/2022 | Hamano | H04N 7/183 |

* cited by examiner

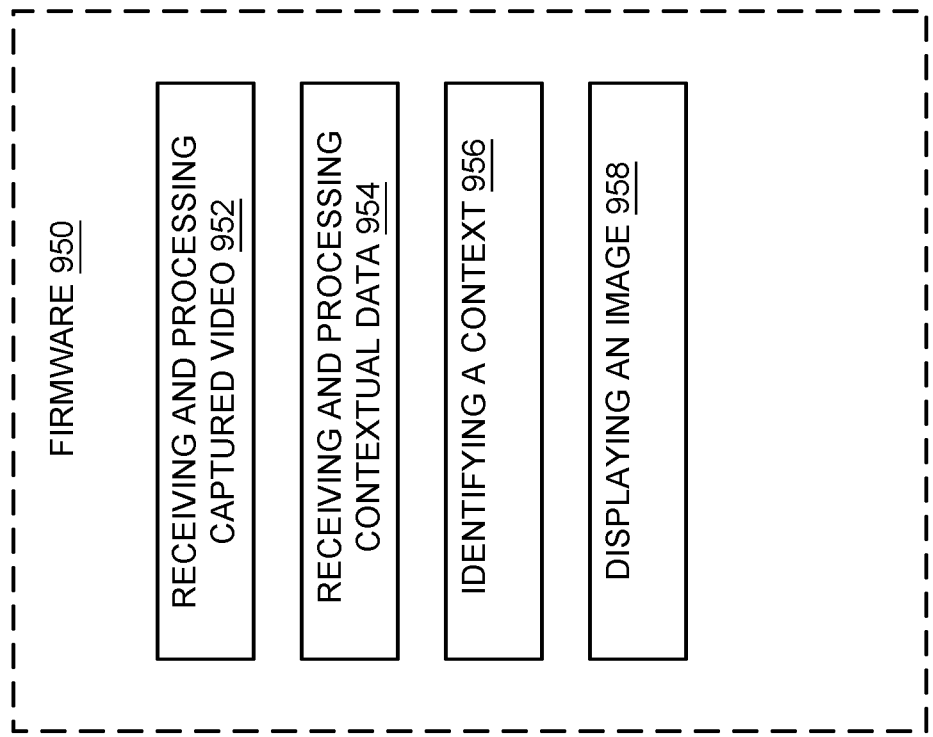
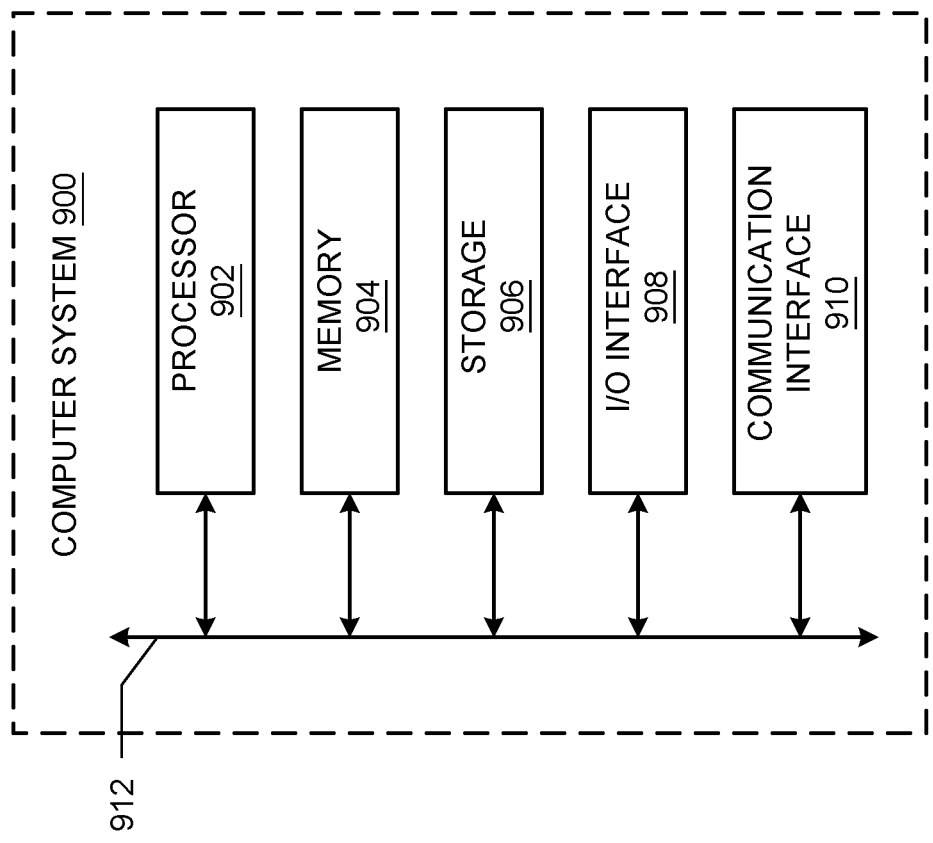
FIG. 9B
FIG. 9A

REAR DISPLAY ENHANCEMENTS

INTRODUCTION

The present disclosure relates to vehicles, and more specifically, to rear displays in vehicles.

SUMMARY

The present disclosure describes various techniques for using a rear display in a vehicle. According to an embodiment a system includes a plurality of cameras, a first display, a second display, and at least one processor. The plurality of cameras includes a first camera positioned on an exterior of a vehicle. The first camera captures a first video. The first display is integrated into the vehicle and positioned proximate to a driver's seat. The second display is integrated into the vehicle and positioned proximate to a rear passenger seat. The at least one processor executes instructions to identify a first context of the vehicle or a rear passenger and provide, on the second display and based on the first context, a first image from the first video.

The first context may be identified based at least in part on motion data, and the first context may relate to a movement of the vehicle. The first camera may be selected from the plurality of cameras based on the first context.

The plurality of cameras may include a second camera positioned on the exterior of the vehicle and oriented in a different direction than the first camera. The second camera may capture a second video. The at least one processor may provide, on the second display, the second video based on a second context. The second context may be identified based at least in part on user input to switch views from the first camera to the second camera.

The system may include a weight sensor and a motion sensor. The weight sensor may be positioned in the rear passenger seat. The motion sensor may detect a movement of the vehicle. The first context may be identified based at least in part on (i) the weight sensor detecting the rear passenger and (ii) the detected movement. The at least one processor may turn on the second display based on the first context.

The first context may be identified based at least in part on user input. The first camera may capture the first image based on the first context.

The first context may be identified based at least in part on a detected location of the vehicle. The at least one processor may instruct the first camera to capture the first image based on the first context. The plurality of cameras may include a second camera positioned in an interior of the vehicle. The at least one processor may instruct the second camera to capture a second image when the first camera captures the first image.

The at least one processor may provide, on the second display, an indication of how far the vehicle is from a destination.

The at least one processor may provide the first video on the first display.

According to another embodiment, a method includes capturing, by a first camera of a plurality of cameras of a vehicle, a first video. The first camera is positioned on an exterior of the vehicle. The method may also include identifying, by at least one processor, a first context of the vehicle or a rear passenger and providing, based on the first context, a first image from the first video on a first display integrated into the vehicle and positioned proximate to a rear passenger seat. The vehicle may include a second display integrated into the vehicle and positioned proximate to a driver's seat.

The method may include selecting the first camera from the plurality of cameras based on the first context. The first context may be identified based at least in part on motion data.

One or more views of the plurality of cameras displayed on the first display may be based on the first context. The first context may be identified based at least in part on motion data.

The method may include providing, by the at least one processor and on the first display, a second video captured by a second camera of the plurality of cameras based on a second context. The second camera may be positioned on the exterior of the vehicle and oriented in a different direction than the first camera. The second context may be identified based at least in part on user input to switch views from the first camera to the second camera.

The method may include detecting, by a motion sensor, a movement of the vehicle and turning on, by the at least one processor, the first display based on the first context. The first context may be identified based at least in part on (i) a weight sensor positioned in the rear passenger seat detecting the rear passenger and (ii) the detected movement of the vehicle.

The method may include capturing, by the first camera, the first image based on the first context. The first context may be identified based at least in part on user input.

The method may include detecting, by the at least one processor, a location of the vehicle. The first context may be identified based at least in part on the detected location of the vehicle. The method may also include instructing, by the at least one processor, the first camera to capture the first image based on the first context. The method may include instructing, by the at least one processor, a second camera of the plurality of cameras to capture a second image when the first camera captures the first image. The second camera may be positioned in an interior of the vehicle.

The method may include providing, by the at least one processor and on the second display, an indication of how far the vehicle is from a destination.

According to another embodiment, a non-transitory computer readable medium stores instructions that, when executed by at least one processor, cause the at least one processor to instruct a first camera of a plurality of cameras to capture a first video. The first camera is positioned on an exterior of a vehicle. The at least one processor also identifies a context of the vehicle or a rear passenger and provides, on a first display integrated into the vehicle and positioned proximate to a rear passenger seat and based on the context, an image from the first video. The vehicle includes a second display integrated into the vehicle and positioned proximate to a driver's seat.

BRIEF DESCRIPTION OF THE DRAWINGS

FIG. 9A is a schematic of an example computer system.

FIG. 9B illustrates example firmware for one or more vehicle ECUs.

DETAILED DESCRIPTION

Figure 1:
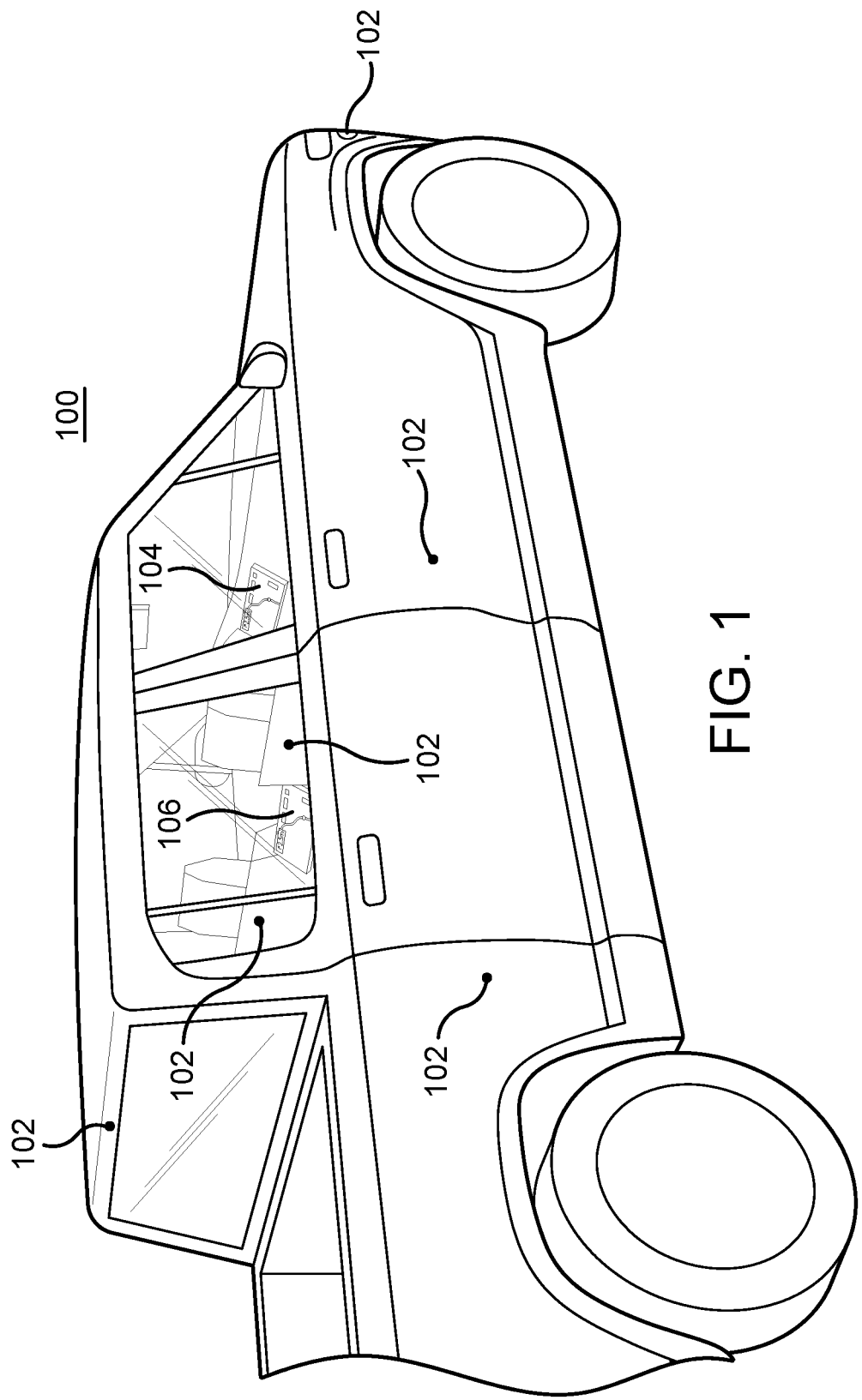
FIG. 1 illustrates an example vehicle, in accordance with certain embodiments.

Vehicles may include displays on the interior of the vehicles that present information to the driver and passengers of the vehicle. For example, a vehicle may include a front display positioned on the dashboard next to the driver and the front passenger. The front display may provide information that is pertinent to the driver (e.g., navigation information, radio information, messaging information, climate control information, etc.). Some vehicles also include a rear display positioned in front of the rear passenger seat (e.g., on a center console between the driver's seat and the front passenger's seat). In certain existing vehicles, however, the rear display sees limited use. For example, some rear displays are used merely to present climate control information to the rear passengers.

The present disclosure describes various ways to improve the usage of a rear display in a vehicle. According to the embodiments described herein, the rear display may be used to present images or videos captured by cameras positioned on the vehicle depending on an identified context of the vehicle or a passenger. In this manner, the vehicle provides enhanced rear display capabilities that are unavailable in certain existing vehicles. In some embodiments, the context of the vehicle or the passenger may refer to a status or state of the vehicle or the passenger. The context may indicate any suitable number of statuses or states of the vehicle or the passenger. For example, the context may indicate a movement of the vehicle, a location of the vehicle, the presence of a passenger, the number of passengers in the vehicle, the age of a passenger, and/or the desires of a passenger.

The context may be identified using contextual data, such as motion sensor data, weight sensor data, user input, location data, etc. For example, the contextual data may include weight sensor data for a rear passenger seat and motion sensor data indicating a movement of the vehicle. Using this contextual data, the vehicle may determine a context that indicates a rear passenger is present in the vehicle and that the vehicle is moving forward on a bumpy road. In response, the vehicle may activate a front-facing camera to capture images or video of the road ahead of the vehicle. The vehicle may then present the captured images or video on a rear display for the rear passenger to view. In this manner, the rear passenger may see the road ahead of the vehicle and better anticipate the movement of the vehicle, which may reduce the negative impact of motion sickness for the rear passenger.

As another example, the contextual data may include user input indicating a button press, a touch on a portion of a touchscreen, or a spoken message. Using this contextual data, the vehicle may identify a context that indicates a user command to switch cameras. In response, the vehicle may activate a rear-facing camera to capture images or video of the road behind the vehicle. The vehicle may then present the captured image or video on the rear display for the rear passenger to view. In this manner, the rear passenger may control which camera is used to generate images or videos for the rear display. In some instances, the vehicle may identify, based on the contextual data that includes user input, a context that indicates a user command to capture an image. In response, the vehicle may use the selected camera to capture an image and to present the captured image on the rear display. In this manner, the rear passenger may control when to capture and store an image using the selected camera.

As yet another example, the contextual data may include weight sensor data and user input indicating a spoken message. Using this contextual data, the vehicle may identify a context that indicates that the spoken message is "are we there yet?" and that the rear passenger is a child. In response, the vehicle may present navigation information on the rear display indicating how far the vehicle is from the destination or how much time it will take the vehicle to reach the destination.

FIG. 1 illustrates an example vehicle 100. As seen in FIG. 1, the vehicle 100 has multiple cameras 102 positioned on or in the vehicle 100. Some of the cameras 102 are positioned on the exterior of the vehicle 100. These exterior cameras 102 may be oriented or pointed in different directions to capture different views around the vehicle 100. For example, there may be a camera 102 positioned near the front of the vehicle 100. This camera 102 may be pointed forwards to capture a view in front of the vehicle 100. As another example, there may be a camera 102 positioned on the side of the vehicle 100. This camera 102 may be pointed to the side of the vehicle 100 to capture a view on the left or the right of the vehicle 100. There may be other cameras 102 positioned on the exterior of the vehicle 100 (e.g., a camera 102 positioned near the rear of the vehicle 100 and pointed towards the back of the vehicle 100 and another camera positioned near the top of the vehicle 100 and pointed upwards from the vehicle 100). Each of these exterior cameras 102 may capture a particular view or perspective on the outside of the vehicle 100.

The vehicle 100 may also include one or more cameras 102 positioned in the interior of the vehicle 100. These cameras 102 may be oriented or directed towards the seats or passengers within the vehicle 100. The interior cameras 102 may capture images or video of the seats or passengers within the vehicle 100. For example, the vehicle 100 may include a camera 102 that is directed towards the driver or a front passenger in the vehicle 100, and the vehicle 100 may include a camera 102 that is directed towards the rear passengers in the vehicle 100.

Generally, the images or videos captured by the exterior cameras 102 or the interior cameras 102 may be presented on various displays in the vehicle 100. As seen in FIG. 1, the vehicle 100 includes a front display 104 and a rear display 106. The front display 104 is positioned in front of a front row of seats in the vehicle 100 (e.g., in front of a driver's seat and a front passenger seat) for viewing by a driver or a front passenger. The rear display 106 is positioned in front of a rear row of seats in the vehicle 100 for viewing by rear passengers. For example, the rear display 106 may be positioned on a center console between the driver's seat and the front passenger's seat. The videos or images captured by the cameras 102 may be presented on the rear display 106. The rear display 106 may present these videos or images for viewing by rear passengers in the vehicle 100. In some embodiments, the videos or images captured by the cameras 102 may also be presented on the front display 104 for viewing by a driver, or a front passenger of the vehicle 100.

Figure 2:
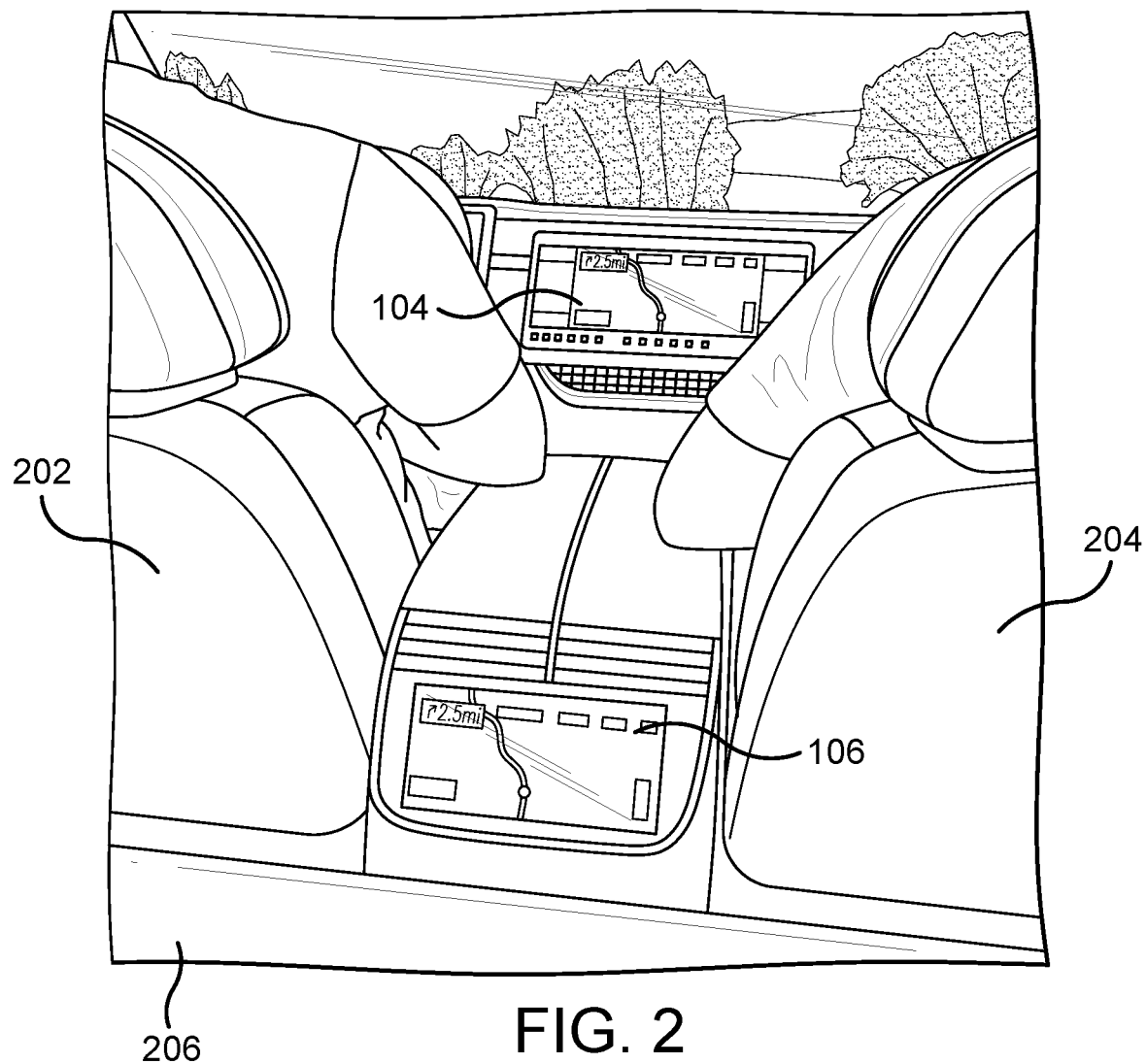
FIG. 2 illustrates an example interior of the vehicle of FIG. 1, in accordance with certain embodiments.

FIG. 2 illustrates an example interior of the vehicle 100 of FIG. 1. Generally, FIG. 2 shows a portion of the interior of the vehicle 100. As seen in FIG. 2, the interior of the vehicle 100 includes the front display 104, the rear display 106, a driver's seat 202, a front passenger's seat 204, and a rear passenger seat 206.

A driver may sit in the driver's seat 202 and control the operation of the vehicle 100. From the driver's seat 202, the driver may view the front display 104 and operate a steering wheel. The front display 104 is positioned in front of the driver's seat 202 and the front passenger seat 204 for viewing by a driver or a front passenger. In the example of FIG. 2, the front display 104 is positioned between the driver's seat 202 and the front passenger's seat 204. The front display 104 may present information and control options to the driver. For example, the front display 104 may provide navigation information, radio information, messaging information, and climate control information to the driver. Additionally, the front display 104 may allow the driver to control different aspects of the vehicle 100 (e.g., controlling the navigation, the radio, messaging, or climate within the vehicle 100).

In some embodiments, the front display 104 may present images or videos captured by one or more of the cameras 102 on or in the vehicle 100. For example, the front display 104 may present an image or video captured by a front facing camera 102 near the front of the vehicle 100 and on the exterior of the vehicle 100. As another example, the front display 104 may present an image or video captured by a rear-facing camera positioned near the rear of the vehicle 100 and on the exterior of the vehicle 100. As yet another example, the front display 104 may present an image or video captured by an interior camera 102 directed towards a rear passenger seat in the vehicle 100. The driver may view the images or videos presented on the front display 104 to better understand the environment around the vehicle 100 or the environment within the vehicle 100. In the example of FIG. 2, the front display 104 is presenting navigation information (e.g., a navigation map).

The rear display 106 may be positioned near the rear passenger seat 206 and directed towards a rear passenger sitting in the rear passenger seat 206. The rear display 106 may be positioned in any location in the vehicle 100 for viewing by a rear passenger in the rear passenger seat 206. In the example of FIG. 2, the rear display 106 is positioned on a center console between the driver's seat 202 and the front passenger seat 204. In the other examples, one or more rear displays 106 may be positioned on the backside of the driver's seat 202 or the back of the front passenger's seat 204 (e.g., on the backs of the headrests of the driver's seat 202 or the front passenger's seat 204). In certain instances, a rear display 106 may be attached to the roof of the vehicle 100. The rear display 106 may drop down or flip down to be viewed by the rear passenger.

A rear passenger sitting in the rear passenger seat 206 may view the images or videos presented on the rear display 106. In certain existing vehicles, the rear display 106 may be limited to displaying climate control information to the rear passenger. As described in more detail below, the embodiments herein provide enhanced capabilities or use cases for the rear display 106 that provide additional features and options for the rear passenger. Some of these enhanced capabilities may be triggered depending on the vehicle 100 identifying certain contexts for the vehicle 100 and/or a passenger in vehicle 100, such as a rear passenger.

Figure 3:
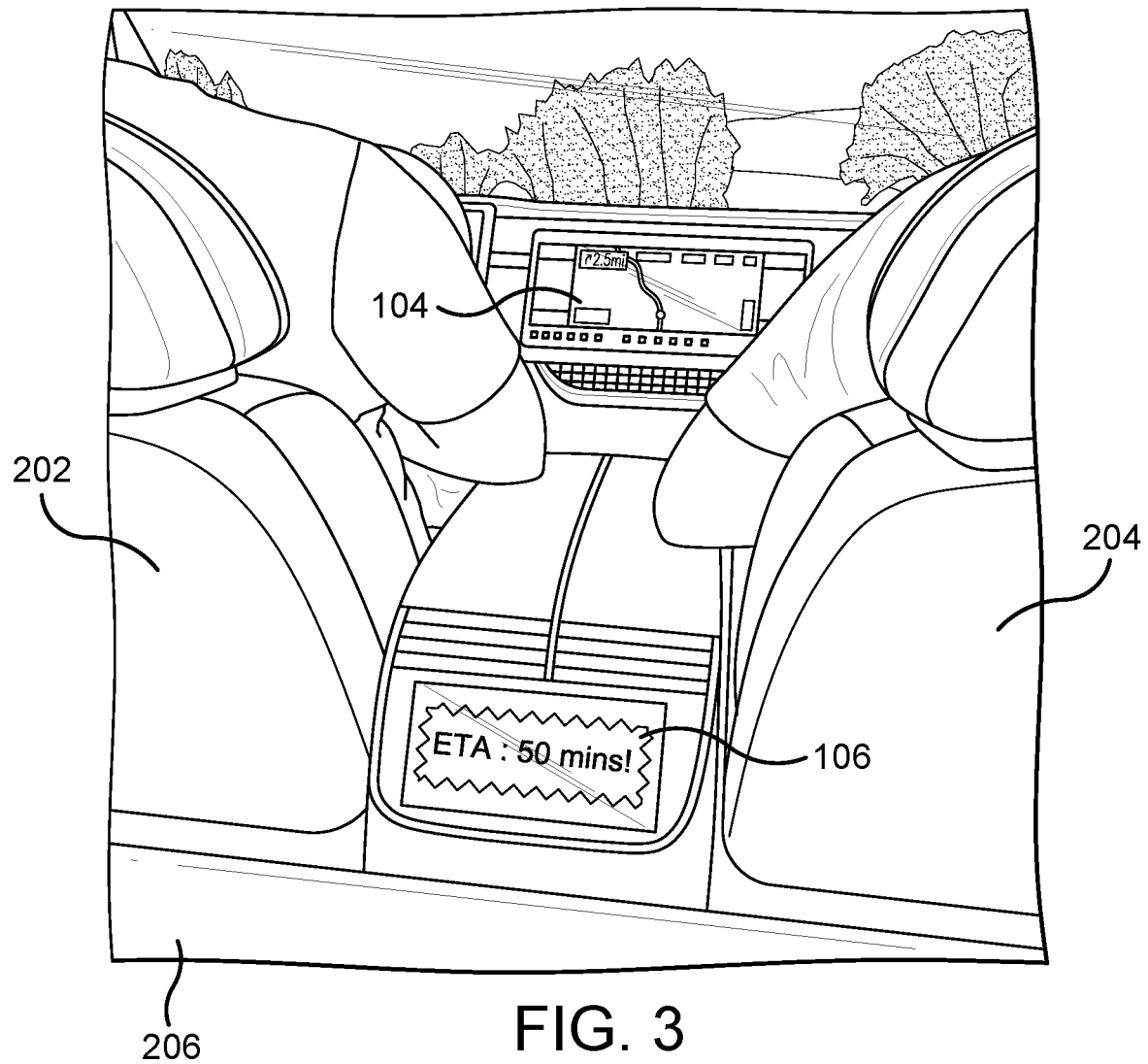
FIG. 3 illustrates an example interior of the vehicle of FIG. 1, in accordance with certain embodiments.

In the example of FIG. 2, the rear display 106 is presenting the same navigation information (e.g., a navigation map) that is presented on the front display 104. In some use cases, the rear display 106 presents a different image or video than the front display 104. In the example of FIG. 3, the rear display 106 is presenting navigation information that is different from the navigation information presented on the front display 104. The navigation information on the rear display 106 may be simplified or more colorful or entertaining compared to the navigation information shown on the front display 104. The information on the rear display 106 may be presented, for example, in response to a child in the rear passenger seat 206 asking "are we there yet?" In this manner, the rear display 106 presents navigation information that may be more relevant or more easily consumed by the child. In other words, the font, format, coloring, or other aspects of the navigation information displayed on the rear display 106 may be customized or personalized based on the characteristics (e.g., age) of one or more of the rear passengers.

Figure 4:
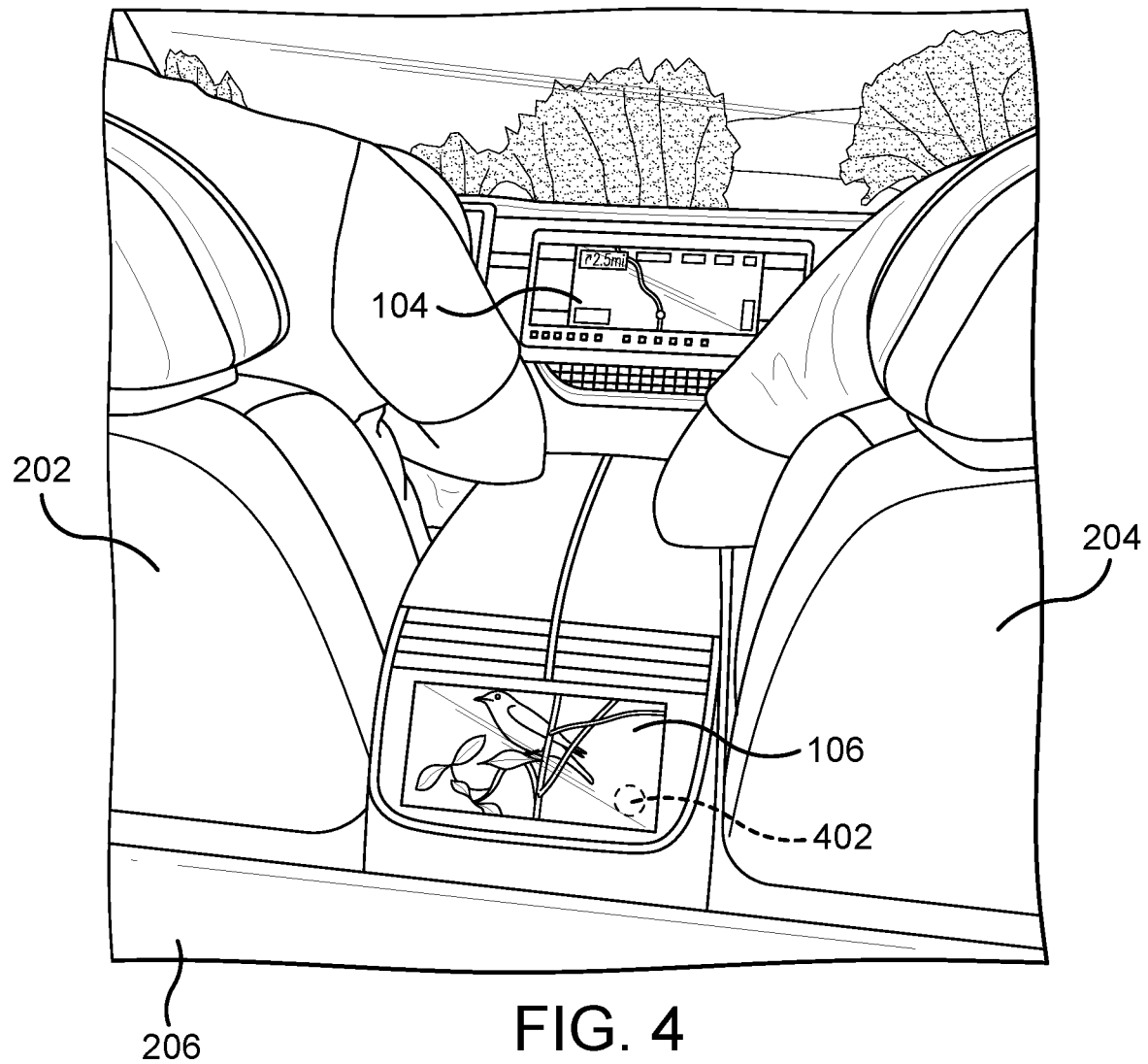
FIG. 4 illustrates an example interior of the vehicle of FIG. 1, in accordance with certain embodiments.

In the example of FIG. 4, the front display 104 shows the navigation information while the rear display 106 shows a different image of a bird. For example, a camera 102 on the vehicle 100 may have captured the image of the bird and the image may be presented on the rear display 106. The rear display 106 also presents a soft button 402 with which a rear passenger may interact (e.g., touch on the rear display 106) to instruct the vehicle 100 to use the camera 102 to take a picture.

Figure 5:
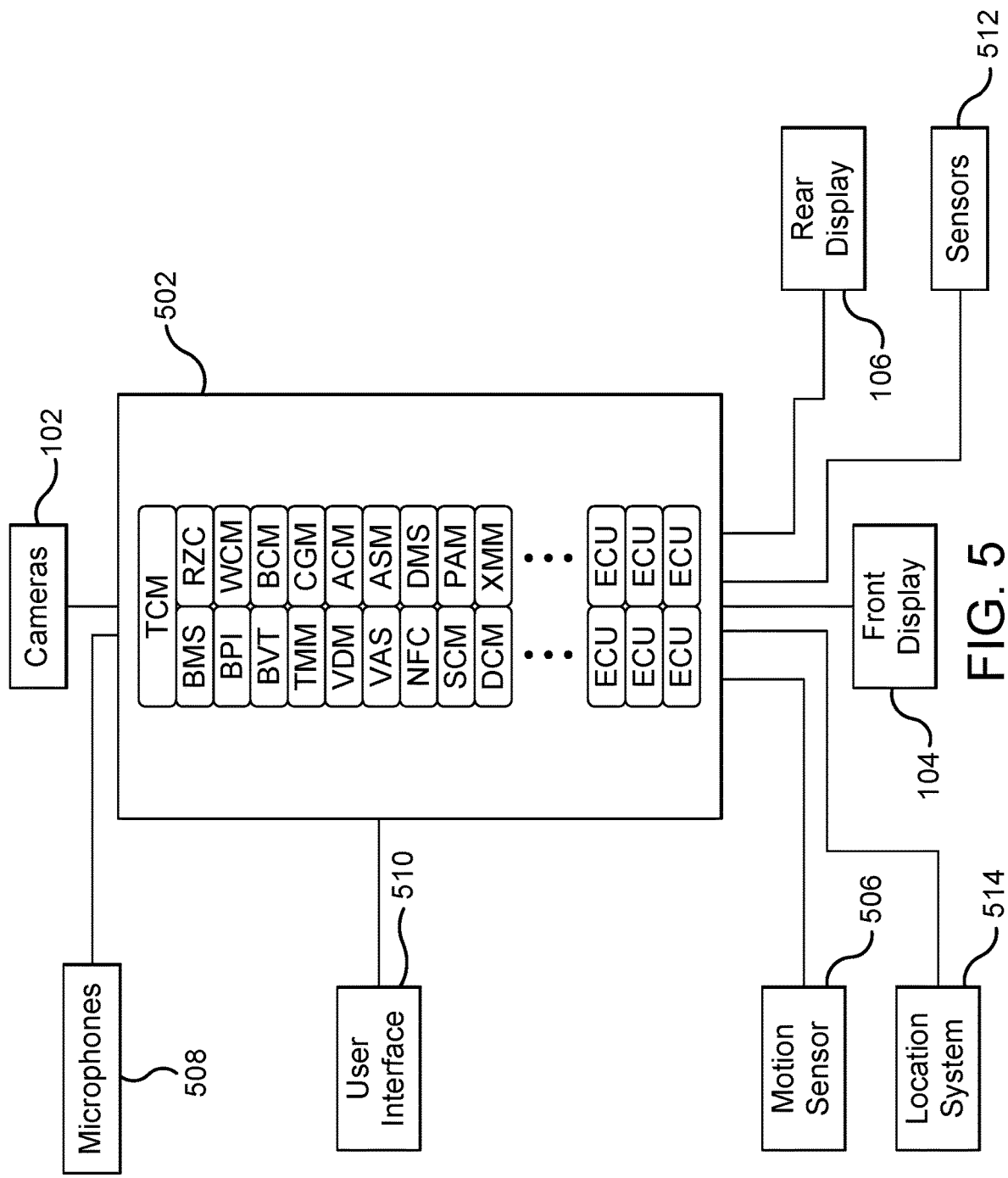
FIG. 5 illustrates example components of the vehicle of FIG. 1, in accordance with certain embodiments.

FIG. 5 illustrates example components of the vehicle 100 of FIG. 1. As seen in FIG. 5, the vehicle 100 includes the cameras 102, the front display 104, the rear display 106, a control system 502, a motion sensor 506, one or more microphones 508, a user interface 510, one or more sensors 512, and a location system 514. Generally, the components of the vehicle 100 operate together to present images or videos on the front display 104 and/or the rear display 106. For example, the components of the vehicle 100 may gather and send contextual data to the control system 502. The control system 502 may identify a context of the vehicle 100 using the contextual data. Depending on the context, the control system 502 then presents an image on the front display 104 and/or the rear display 106.

As discussed above, the cameras 102 may be positioned on the exterior or in the interior of the vehicle 100. The cameras 102 may be pointed in different directions to capture different perspectives of the exterior or interior of the vehicle 100. Images or videos captured by the cameras 102 may be presented on the front display 104 and/or the rear display 106 (e.g., depending on a context identified by the vehicle 100).

Figure 6:
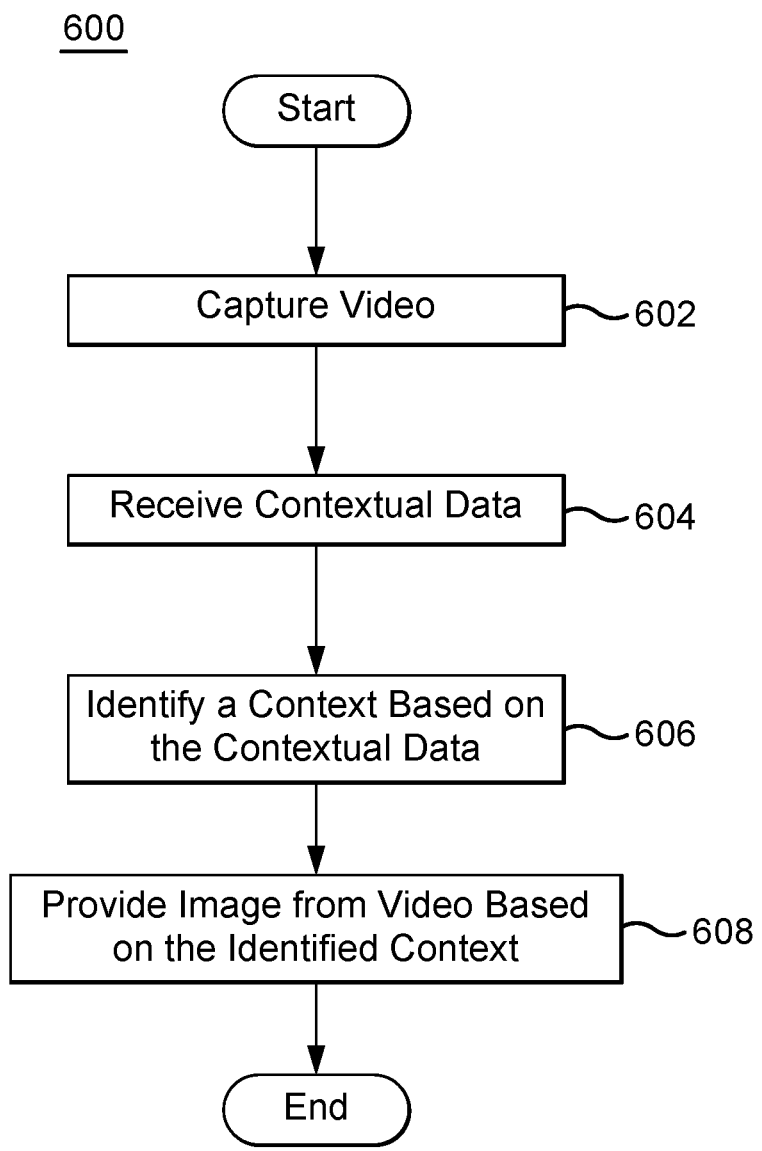
FIG. 6 is a flowchart of example operations performed by the vehicle of FIG. 1, in accordance with certain embodiments.
Figure 7:
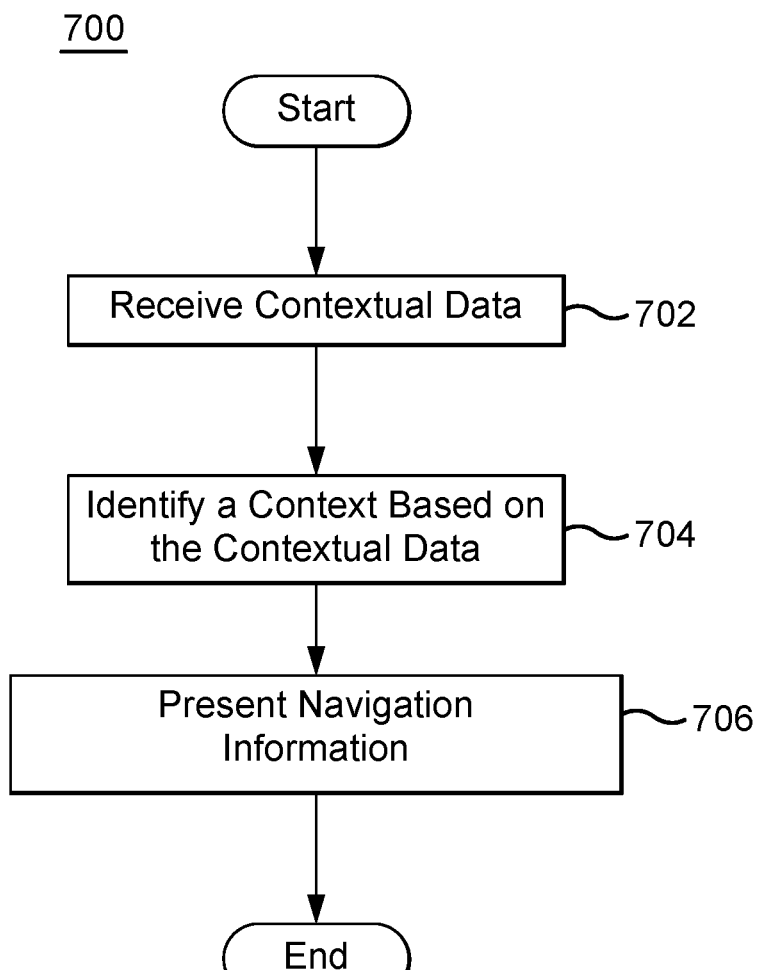
FIG. 7 is a flowchart of example operations performed by the vehicle of FIG. 1, in accordance with certain embodiments.
Figure 8:
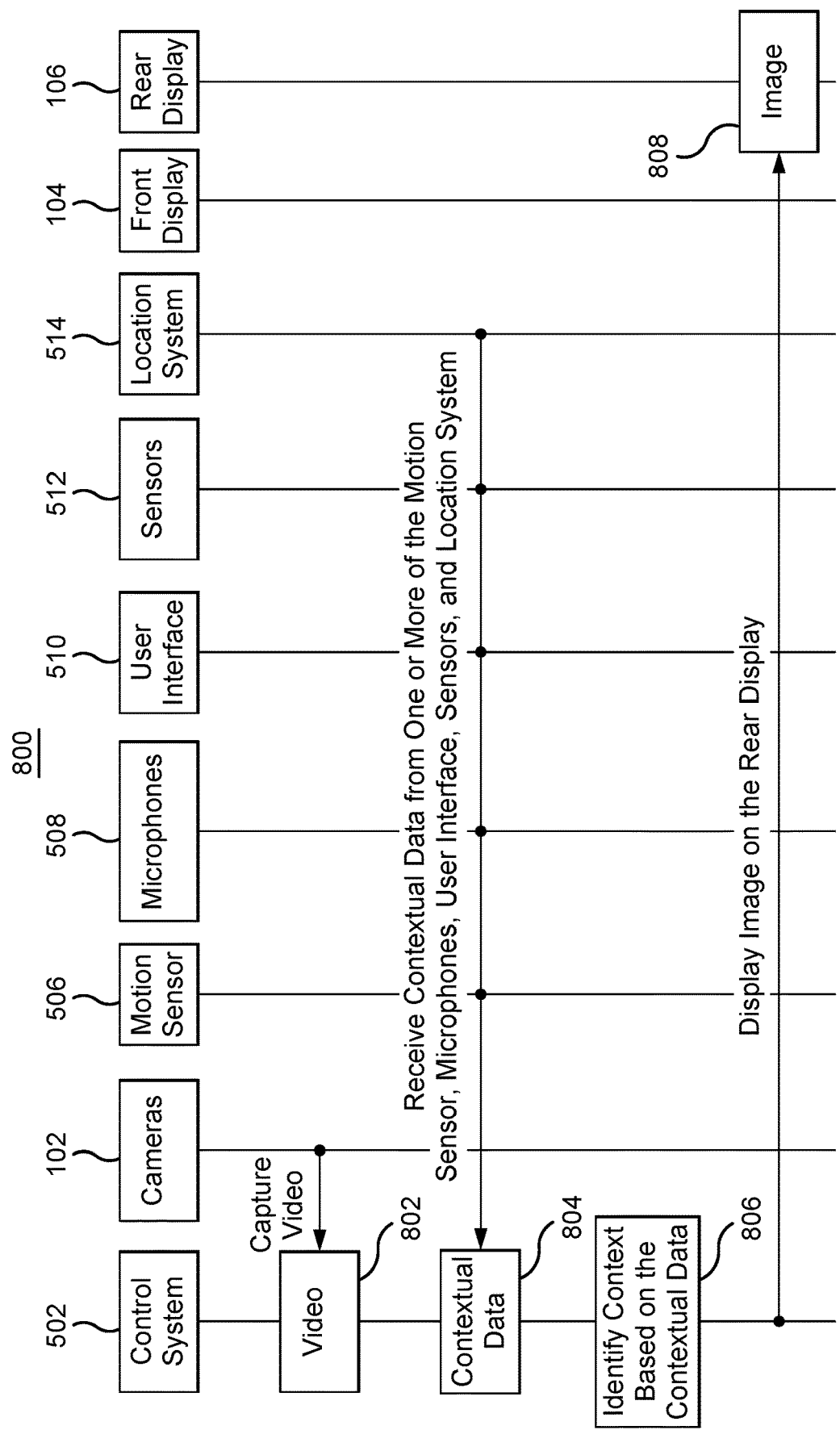
FIG. 8 illustrates a sequence diagram of example operations performed by the vehicle of FIG. 1, in accordance with certain embodiments.

The control system 502 executes instructions to perform at least some of the actions or functions of the vehicle 100, including the functions described in relation to FIGS. 6-8. For example, as shown in FIG. 5, the control system 502 may include one or more electronic control units (ECUs) configured to perform at least some of the actions or functions of the vehicle 100, including the functions described in relation to FIGS. 6-8. In certain embodiments of FIG. 5, each of the ECUs is dedicated to a specific set of functions. Each ECU may be a computer system (as described further in FIGS. 9A and 9B), and each ECU may include functionality provided by one or more of the example ECUs described below.

Certain features of the embodiments described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device, in-vehicle navigation, vehicle-to-vehicle communication, communication between the vehicle and landscape features (e.g., automated toll road sensors, automated toll gates, power dispensers at charging stations), or automated calling functionality.

Certain features of the embodiments described herein may be controlled by a Central Gateway Module (CGM) ECU. The CGM ECU may serve as the vehicle's communications hub that connects and transfer data to and from the various ECUs, sensors, cameras, microphones, motors, displays, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode), and thereby control certain vehicle components related to placing the vehicle in one of the vehicle modes.

In various embodiments, the CGM ECU collects sensor signals from one or more sensors of vehicle 100. For example, the CGM ECU may collect data from motion sensor 506, cameras 102, microphones 508, and sensors 512. The sensor signals collected by the CGM ECU are then communicated to the appropriate ECUs for performing, for example, the operations and functions described in relation to FIGS. 6-8.

The control system 502 may also include one or more additional ECUs, such as, by way of example and not limitation: a Vehicle Dynamics Module (VDM) ECU, an Experience Management Module (XMM) ECU, a Vehicle Access System (VAS) ECU, a Near-Field Communication (NFC) ECU, a Body Control Module (BCM) ECU, a Seat Control Module (SCM) ECU, a Door Control Module (DCM) ECU, a Rear Zone Control (RZC) ECU, an Autonomy Control Module (ACM) ECU, an Autonomous Safety Module (ASM) ECU, a Driver Monitoring System (DMS) ECU, and/or a Winch Control Module (WCM) ECU. If vehicle 200 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a Thermal Management Module (TMM) ECU. In various embodiments, the XMM ECU transmits data to the TCM ECU (e.g., via Ethernet, etc.). Additionally or alternatively, the XMM ECU may transmit other data (e.g., sound data from microphones 508, etc.) to the TCM ECU. In various embodiments, the control system 502 may also include one or more image processing ECUs (IP ECUs) that process video data (e.g., a series of images) received from cameras 102. The IP ECUs may also be configured to execute object detection algorithms to identify objects depicted in the video data.

The motion sensor 506 may detect a movement of the vehicle 100 and send contextual data indicating this detected movement to the control system 502. For example, the motion sensor 506 may include an accelerometer for measuring the magnitude and direction of acceleration and/or a gyroscope that for detecting orientation and angular velocity. The motion sensor 506 may detect when the vehicle 100 is moving uphill or downhill. The motion sensor 506 may detect when the vehicle 100 is moving over a bumpy road or surface. The motion sensor 506 may also detect when the vehicle 100 is turning left or right. The motion sensor 506 may further detect when the vehicle 100 is accelerating or decelerating. The motion sensor 506 may report the detected movements of the vehicle 100 as contextual data to the control system 502. The contextual data generated by the motion sensor 506 may be used to identify a context for the vehicle 100 and determine whether images or videos should be presented on the front display 104 and/or the rear display 106.

The microphones 508 may be positioned on the interior of the vehicle 100. The microphones 508 may capture audio signals produced from the inside of the vehicle 100 and send contextual data indicating the audio signals to the control system 502. For example, the microphones 508 may capture speech of the driver or the passengers in the vehicle 100. The microphones 508 may communicate the detected audio information as contextual data to the control system 502. The audio information may be used to identify a context for the vehicle 100 and/or a passenger and determine whether images or videos should be presented on the front display 104 and/or the rear display 106.

The user interface 510 allows a user, such as a driver or passenger in the vehicle 100, to provide input signals, and the user interface 510 may send contextual data indicating the user input to the control system 502. For example, the user interface 510 may include buttons, switches, or a touchscreen that allow a user to provide input signals to the vehicle 100. The buttons or switches may be positioned near the front display 104 and/or the rear display 106. The touchscreen may be integrated with the front display 104 and/or the rear display 106. The user interface 510 may communicate the received user input (e.g., button presses, switch operations, or touches on the touchscreen) as contextual data to the control system 502. The user input may be used to identify a context for the vehicle 100 and/or a passenger and determine whether images or videos should be presented on the front display 104 or the rear display 106.

The sensors 512 may detect any suitable information about the vehicle 100 and send contextual data indicating the detected information to the control system 502. For example, the sensors 512 may include weight sensors that are positioned within the seats of the vehicle 100. These weight sensors may detect whether passengers are present. As an example, a weight sensor may be positioned in the rear passenger seat, and this weight sensor may detect whether a rear passenger is present in the vehicle 100 and sitting in the rear passenger seat. Other sensors 512 may include temperature sensors and optical sensors. The sensors 512 may communicate their corresponding detected information as contextual data to the control system 502. The detected information may be used to identify a context for the vehicle 100 and/or a passenger and determine whether images or videos are presented on the front display 104 and/or the rear display 106.

The location system 514 may detect a physical location of the vehicle 100 and send contextual data indicating the physical location to the control system 502. For example, the location system 514 may include a global positioning system that detects coordinates representing the physical location of the vehicle 100 on Earth. The location system 514 may report the detected location of the vehicle 100 as contextual data to the control system 502. The detected location may be used to identify a context for the vehicle 100 and/or a passenger and determine whether images or videos are presented on the front display 104 or the rear display 106.

The control system 502 may analyze the contextual data to identify a context for the vehicle 100. For example, the control system 502 may analyze contextual data from a weight sensor to determine whether a passenger is present in the vehicle 100. In such an example, the identified context may indicate the number of passengers in the vehicle 100 and where these passengers are seated in the vehicle 100. As another example, the control system 502 may analyze information from the motion sensor 506 to determine how the vehicle is moving. In such an example, the identified context may indicate whether the vehicle 100 is accelerating or decelerating, moving uphill or downhill, turning left or right, or moving on a smooth or bumpy surface. The control system 502 may analyze input provided through the user interface 510 to determine commands issued by users. In such an example, the identified context may indicate a user selection of a particular camera 102 of the vehicle 100 or to capture an image using a particular camera 102 of the vehicle 100. As yet another example, the control system 502 may analyze location data from the location system 514 to determine a location of the vehicle 100. In such an example, the identified context may indicate the physical location of the vehicle 100 on Earth and whether the vehicle 100 is at a particular location (e.g., near a landmark).

The control system 502 may perform certain actions in response to or based on the identified context. For example, if the control system 502 identifies the context as a rear passenger being present in the vehicle 100 and the vehicle moving uphill or moving on a bumpy surface, then the control system 502 may turn on the rear display 106 and present an image or video captured by a front camera 102 on the vehicle 100. As a result, the rear display 106 presents an image or a video showing the road ahead of the vehicle 100 to the rear passenger. When the rear passenger views the presented image or video, the rear passenger may better anticipate the movement of the vehicle 100 as the vehicle 100 travels on the road, which may reduce the negative impact of motion sickness for the rear passenger.

As another example, if the control system 502 identifies a context that includes user input to switch cameras 102, the control system 502 may present an image or video captured by a different camera 102 on or in the vehicle 100. For instance, if the rear display 106 is presenting an image or video captured by a front camera 102 on the vehicle 100, and the identified context includes a user command to switch to a rear camera 102, the control system 502 may cause the rear display 106 to present an image or video captured by the rear camera 102 on the vehicle 100. As a result, the rear passenger viewing the rear display 106 may begin seeing the image or video captured by the rear camera 102 of the vehicle 100.

As another example, if the control system 502 identifies a context that includes user input to capture an image, then the control system 502 may cause the camera 102 to capture the image. The captured image may then be presented on the front display 104 and/or the rear display 106. The captured image may also be saved for later viewing or added to a digital photo album. As an example, if the rear display 106 is presenting a video captured by a front camera 102 on the vehicle 100, and the rear passenger presses a button that issues a command to capture an image, the control system 502 may identify the context as including the user input to capture the image. In response, the control system 502 may instruct the front camera 102 to capture the image, causing the camera 102 to capture the image. The control system 502 may then present the captured image on the rear display 106. The captured image may also be saved for subsequent viewing or added to a digital album. For example, the control system 502 may transmit the image to a cloud-based server operable to save and/or add the image to a digital album. In some embodiments, the captured image is stored for subsequent viewing or added to a digital album without being presented on the front display 104 or the rear display 106.

In certain embodiments, the vehicle 100 sends the captured image to another device that is in communication with the vehicle 100. For example, the vehicle 100 may send the captured image to a computing device (e.g., mobile phone, tablet, laptop, and/or similar devices) of a passenger in the vehicle for viewing. In such an example, the passenger's computing device may execute a software application configured to receive and display the captured image as well as perform other functionality, such as adding the captured image to a digital photo album, etc.

In some embodiments, the control system 502 may instruct a camera 102 of the vehicle 100 to automatically take a picture. For example, when the control system 502 identifies a context that indicates the location of the vehicle 100 being near a particular landmark, the control system 502 may instruct an exterior camera 102 to begin taking pictures of the landmark. In response, the exterior camera 102 begins capturing images of the landmark. These images may be displayed on the front display 104 or the rear display 106. Additionally, these images may be stored for subsequent viewing or added to a digital album, as described above.

As another example, the control system 502 may implement an object detection feature, e.g., using an image processing (IP) ECU, by which the control system 502 analyzes one or more images (e.g., a series of images collectively constituting a video) captured by a camera 102 to determine whether certain objects, people, animals, and/or landmarks appear in the one or more images. Once a desired object, person, animal, and/or landmark is detected in an image, the control system 502 may then automatically store the image and instruct the rear display 106 to display the image. For example, if the control system 502 determines that a bear appears in one of the captured images, the control system 502 may store the image in which the bear is detected and then cause the rear display 106 to display the image.

In some embodiments, the control system 502 may use the object detection feature in response to determining, e.g., from the location system 514, that the vehicle 100 is in a location where certain objects, people, animals, and/or landmarks are likely to be present. For example, the control system 502 may turn on and use the object detection feature when the control system 502 determines that the vehicle 100 is in or close to a certain location, such as a tourist city (e.g., to detect landmarks), a national park (e.g., to detect animals), etc. In certain embodiments, the control system 502 may then automatically capture, store, and display all images that include one or more of the objects, people, animals, and/or landmarks that are associated with such certain location.

Additionally or alternatively, the control system 502 may present a list of objects, people, animals, and/or landmarks that are likely to be found in the location the vehicle 100 is in or close to and allow the user to select which one of those objects, people, animals, and/or landmarks the user would like an image of. As an example, if the vehicle 100 is close to Yellowstone National Park, the control system 502 may cause a list of at least some of the objects (e.g., waterfalls) and/or animals that typically appear in Yellowstone to be displayed (e.g., on rear display 106). The user may then select, for example, a bear or a certain bird that the user would like to have an image of. In such an example, upon detecting the animal in one or more images captured by cameras 102, the control system 502 may display such images on rear display 106.

In certain embodiments, the control system 502 may also instruct certain interior cameras 102 to capture images of the driver or passengers when the exterior camera 102 captures images of the object, person, animal, and/or landmark. The interior cameras 102 may then capture images of the driver and/or passengers when the exterior camera 102 captures images of the object, person, animal, and/or landmark. The images of the driver and/or passengers may be stored for subsequent viewing or added to the digital album. In some instances, the images of the driver or rear passengers may be stitched together with the images of the object, person, animal, and/or landmark to show the driver's or passengers' reaction to the object, person, animal, and/or landmark. These stitched images may be presented on the front display 104 and/or the rear display 106.

As yet another example, the control system 502 may receive contextual data in the form of detected audio signals from the microphones 508. The control system 502 may identify a context that includes detected spoken words by a rear passenger. For example, the control system 502 may detect the rear passenger asking, "Are we there yet?" In response, the control system 502 may present navigation information on the rear display 106. The navigation information may indicate the physical location of the vehicle 100 and how far or distant the vehicle 100 is from the destination. The navigation information may also indicate an amount of time remaining on the trip to the destination. The rear passenger may view this information on the rear display 106 to determine how far the vehicle 100 is from the destination. In some embodiments, the control system 502 presents the navigation information on the rear display 106 in a colorful or entertaining way so that the navigation information is more easily understood or consumed by a child in the vehicle 100.

The present disclosure describes the vehicle 100 presenting images or videos on the front display 104 and the rear display 106. It is understood that the videos are also formed from a sequence or series of images (which may be referred to as frames). In some instances, the vehicle 100 may present images by presenting one or more images that form a video. In certain instances, when the vehicle 100 presents a video, it is understood that the vehicle 100 is also presenting images that form the video.

FIG. 6 is a flowchart of an example method 600. In particular embodiments, various components of the vehicle 100 (e.g., the cameras 102, the control system 502, the rear display 106, etc.) of FIG. 1 perform the method 600. By performing the method 600, an image or a video is displayed on the rear display 106 of the vehicle 100 depending on a context of the vehicle 100 identified using contextual data.

In block 602, a camera 102 of the vehicle 100 captures a video. In certain embodiments, the camera 102 may be positioned on an exterior of the vehicle 100. For example, the camera 102 may be a front-facing camera positioned near the front of the vehicle 100. As a result, in such an example, the video captured by the camera 102 is a video of the environment in front of the vehicle 100.

In block 604, the control system 502 of the vehicle 100 receives contextual data. One or more components of the vehicle 100 may provide this contextual data. For example, one or more of the motion sensor 506, the microphones 508, the user interface 510, the sensors 512, and the location system 514 may gather and provide contextual data. The contextual data may include detected movements, detected audio signals, detected weights, detected user input, detected locations of the vehicle 100, and/or other contextual data described herein.

In block 606, the control system 502 identifies a context associated with the vehicle 100 based on the contextual data. The identified context may relate to or indicate any suitable information about the vehicle 100 and/or about the people (e.g., driver and passengers) within the vehicle 100. For example, the control system 502 may use weight sensor data from the sensors 512 to determine a context of the people in the vehicle 100. The context may include the number of passengers in the vehicle 100 and where those passengers are seated. In some instances, the control system 502 may determine a context that indicates that a rear passenger is present in the vehicle 100.

As another example, the control system 502 may use motion sensor 506 data to determine a context of the vehicle 100. The context may include the movement of the vehicle 100 (e.g., forwards, backwards, uphill, downhill, turning, etc.). As yet another example, the control system 502 may use user input to determine a context of the people in the vehicle 100. The context may include the presence and/or desires of a rear passenger. In some instances, the user input may indicate a command relating to the desires of the rear passenger (e.g., capture an image, switch cameras, etc.).

In block 608, the control system 502 provides an image on the rear display 106 depending on the context identified by the control system 502 in block 606. The image may be a single image or one of a plurality of images that constitute a video stream.

Following are several examples of how the vehicle 100 uses contextual data in relation to the method 600. In a first example, the control system 502 may receive contextual data in block 604 from a weight sensor 512 and the motion sensor 506. The weight sensor 512 may be located in the rear passenger seat. The contextual data from the weight sensor 512 may indicate a detected weight. The contextual data from the motion sensor 506 may indicate a detected movement of the vehicle 100. The control system 502 may then identify a context using this contextual data in block 606. For example, the control system 502 may determine from the detected weight that there is a rear passenger sitting in the rear passenger seat. Additionally, the control system 502 may determine from the detected movement that the vehicle 100 is moving uphill on a bumpy road. The control system 502 may determine that, because the vehicle 100 is moving uphill on a bumpy road and because a rear passenger is present in the vehicle 100, the control system 502 should present images captured by a front-facing camera 102 on the vehicle 100 to provide the rear passenger a view of the upcoming road, which may reduce the negative impact of motion sickness on the rear passenger. In block 608, the control system 502 may then turn on the rear display 106 and select the front-facing camera 102. Subsequently, the control system 502 presents images captured by the front-facing camera 102 on the rear display 106 for the rear passenger to view. The images captured by the front-facing camera 102 may form a video. As the rear passenger views the video captured by the front-facing camera 102, the rear passenger may see the road in front of the vehicle 100, which allows the rear passenger to better anticipate the future movements of the vehicle 100. This better anticipation may reduce the impact of motion sickness on the rear passenger.

As a second example, the control system 502 may receive contextual data from the motion sensor 506 in block 604. The motion data may indicate a particular movement of the vehicle 100. The control system 502 may identify a context using this motion data in block 606. For example, the control system 502 may determine that the vehicle 100 is turning left or right based on the detected movement. In response, the control system 502 may select a side camera 102 of the vehicle 100. In block 608, the control system 502 presents images captured by the selected side camera 102 on the rear display 106 for the rear passenger to view. These images may form a video. When the rear passenger views the video captured by the side camera 102, the rear passenger may see the upcoming road as the vehicle 100 turns, which allows the rear passenger to better anticipate the future movement of the vehicle 100. This better anticipation may reduce the impact of motion sickness on the rear passenger.

In a third example, the control system 502 may receive contextual data from the microphones 508 or the user interface 510 in block 604. The contextual data may include user input. For example, the user input may be provided by a rear passenger pushing a button, operating a switch, touching a portion of a touchscreen, or speaking a particular phrase. The control system 502 may process the user input to identify a context in block 606. For example, the control system 502 may determine a command indicated by the user input. The identified context, in this example, includes the command. The command may be to switch from a side camera 102 to a front camera 102. In response to this identified context, the control system 502 switches from the side camera 102 to the front camera 102. In such an example, in block 608, the control system 502 presents, on the rear display 106, images captured by the front camera 102 rather than the side camera 102. In this manner, the control system 502 allows the rear passenger to switch from one camera view to another.

In a fourth example, the control system 502 may receive contextual data from the user interface 510 in block 604. Like in the third example, the contextual data may include user input. The control system 502 may process the user input to identify a context in block 606. The identified context may indicate a user's command to capture an image. For example, the rear passenger may have provided input instructing the front camera 102 to capture the image. In response, the control system 502 instructs the front camera 102 to capture the image. The front camera 102 then captures the image. The control system 502 may then present the image on the rear display 106 for viewing by the rear passenger in block 608. The captured image may be stored for subsequent viewing or added to a digital album. In some embodiments, the vehicle 100 may present a video captured by the camera 102 on the rear display 106 when the rear passenger provides the user input to capture an image. In response to the user input, the control system 502 then instructs the camera 102 to capture an image and presents the image on the rear display 106. This process effectively captures and presents an image (or a frame) from the video captured by the camera 102.

In a fifth example, the control system 502 receives contextual data from the location system 514 in block 604. The contextual data may indicate a physical location of the vehicle 100. For example, the contextual data may include coordinates that indicate the location of the vehicle 100 on Earth. The control system 502 may analyze the contextual data to identify the context in block 606. The identified context may indicate that the vehicle 100 is near a landmark. In response to this context, the control system 502 instructs one or more cameras 102 of the vehicle 100 to begin capturing images so that the cameras 102 capture images of the landmark. The cameras 102 then begin capturing images, and the control system 502 may present these captured images on the rear display 106 for viewing by the rear passenger in block 608. In this manner, the vehicle 100 automatically captures and presents images based on the determined location of the vehicle 100.

In some embodiments, when the exterior cameras 102 are capturing images (e.g., of the landmark), the control system 502 may instruct interior cameras 102 of the vehicle 100 to also take pictures. The interior cameras 102 then capture images of the driver or passengers as the exterior cameras 102 capture images of the landmark. The control system 502 may present the images captured by the interior cameras 102 on the rear display 106. These images may be stitched together with the images taken by the exterior cameras 102. In some embodiments, the control system 502 may stitch together and store the images captured by the cameras 102. In other embodiments, the control system 502 may upload the images to a remote server that stitches the images together. After the server stitches the images together, the server sends the stitched images back to the control system 502. The server may also store the stitched image. The control system 502 then presents the stitched image on the rear display 106. As a result, the vehicle 100 may present images that show landmarks and the reaction of the driver and passengers to the landmarks.

FIG. 7 is a flowchart of an example method 700. In particular embodiments, the control system 502 of the vehicle 100 of FIG. 1 performs the method 700. By performing the method 700, the control system 502 provides information to the rear passenger about how far the vehicle 100 is from an intended destination.

In block 702, the control system 502 of the vehicle 100 receives contextual data from a microphone 508 in the vehicle 100. The microphone 508 may detect audio signals within the vehicle 100. For example, the microphone 508 may detect the rear passenger speaking a certain phrase (e.g., "Are we there yet?"). The microphone 508 may communicate this audio data to the control system 502 of the vehicle 100. Additionally, the control system 502 may receive contextual data from a weight sensor 512 in the rear passenger seat of the vehicle 100. The weight sensor 512 may detect a weight and communicate the weight data to the control system 502. Moreover, the control system 502 may receive contextual data from a camera 102 of the vehicle 100. For example, the camera 102 may capture images or videos of people entering or exiting the vehicle 100 and communicate these images or videos to the control system 502. Furthermore, the control system 502 may receive contextual data 516 from the user interface 510 (e.g., a push of a button, the operation of a switch, a touch on a portion of a touchscreen). The user interface 510 may communicate this user input to the control system 502.

The control system 502 identifies a context based on the received contextual data in block 704. For example, the control system 502 may analyze the weight data from the weight sensor 512 or the images or videos from the camera 102. Based on the weight data or the images or videos, the control system 502 may determine a context indicating whether a rear passenger is present in the vehicle 100. The control system 502 may also analyze the audio data from the microphone 508 to determine that the rear passenger asked, "Are we there yet?" Based on the audio data, the vehicle 100 may determine the context indicating the rear passenger's command or desire to view navigation information. Additionally or alternatively, the control system 502 may analyze the user input from the user interface 510 to determine the context indicating the rear passenger's command or desire to view navigation information.

In some embodiments, the control system 502 may also analyze the weight data from the weight sensor 512, the images or videos from the camera 102, and/or the audio data from the microphone 508 to determine a context indicating an identity of the rear passenger and/or an age of the rear passenger. For example, if the weight data indicates the rear passenger is lighter than an adult or if the audio data indicates a youthful tone of voice, the control system 502 may determine that the rear passenger is a child. As another example, the control system 502 may determine the identity of the rear passenger by analyzing the images or videos from the camera 102 and/or the audio data from the microphone 508.

The control system 502 presents navigation information on the rear display 106 of the vehicle 100 for the rear passenger to view in block 706. The navigation information may include a map that shows the location of the vehicle 100 and a distance between the vehicle 100 and the intended destination. The control system 502 may also indicate on the rear display 106 an amount of time before the vehicle 100 reaches the intended destination. The rear passenger may view the information on the rear display 106 to understand where the vehicle 100 is located and how far the vehicle 100 is from its destination.

In some embodiments, the control system 502 personalizes what is shown on the rear display 106 based on the determined age of the rear passenger. For example, if the control system 502 determines a context indicating that the rear passenger is a child, the control system 502 may format the navigation information to be more colorful or fun so that the navigation information is more engaging to the child. If the control system 502 determines the context indicating that the rear passenger is an adult, the control system 502 may format the navigation information to include more detailed information that is more engaging or informative to the adult. In other words, the content, format, font, color, and other aspects of the navigation information may differ based on the identity and/or age of the rear passenger.

In another example, the control system 502 personalizes what is shown on the rear display 106 based on the determined identity of the rear passenger. For example, the control system 502 may determine a context indicative of the identity of the rear passenger. The control system 502 may then retrieve the profile or account of the rear passenger and determine personalized settings indicated by the profile or account. The profile or account may be stored locally with the vehicle 100, or the profile or account may be stored remotely (e.g., on a remote server). The control system 502 may then format the presented navigation information according to these personalized settings (e.g., the desired brightness level, zoom level, color settings, font settings, etc.).

FIG. 8 illustrates a sequence diagram 800 of example operations performed by the vehicle 100 of FIG. 1. As seen in FIG. 8, various components of the vehicle 100 (e.g., the control system 502, the cameras 102, the motion sensor 506, the microphones 508, the user interface 510, the sensors 512, the location system 514, the front display 104, and the rear display 106) perform the steps of the operation.

The operation may begin with the cameras 102 capturing a video 802 and communicating the video 802 to the control system 502. The cameras 102 may be positioned on the exterior or interior of the vehicle 100 and may capture video 802 of the exterior of the interior of the vehicle 100.

One or more of the motion sensor 506, the microphones 508, the user interface 510, the sensors 512, and the location system 514 send contextual data 804 to the control system 502. For example, the motion sensor 506 may send contextual data 804 indicating a detected movement of the vehicle 100. The microphones 508 may send contextual data 804 indicating a detected audio signal. The user interface 510 may send contextual data 804 indicating user input. The sensor 512 may send contextual data 804 indicating a detected weight of a passenger. The location system 514 may send contextual data 804 indicating coordinates for the physical location of the vehicle 100.

The control system 502 then identifies a context 806 using the contextual data 804. For example, the control system 502 may determine a context 806 indicating how many passengers are in the vehicle 100 and where they are seated. The context 806 may also indicate whether the vehicle 100 is moving uphill or downhill. The context 806 may indicate a phrase spoken by one of the passengers or input provided by one of the passengers. The context 806 may indicate a physical location of the vehicle 100 on Earth.

The control system 502 presents an image 808 on the rear display 106 based on the context 806. For example, the control system 502 may present an image or video captured from the front of the vehicle 100 if the context 806 indicates that there is a rear passenger in the vehicle 100 and that the vehicle 100 is moving uphill. As another example, the control system 502 may present navigation information on the rear display 106 if the context 806 indicates that the phrase "are we there yet?" was spoken. It is understood that, at least in certain embodiments, navigation information is displayed in the form of one or more images or frames, each indicative of a certain location of the vehicle 100 or its distance for a certain destination. In this manner, the control system 502 presents information on the rear display 106 that is more helpful for or relevant to the rear passenger.

In summary, various ways to improve the usage of a rear display 106 in a vehicle 100 are presented. Generally, the rear display 106 may be used to present images or videos captured by cameras 102 positioned on the vehicle 100 depending on an identified context 518 of the vehicle 100 or a rear passenger. The rear display 106 may present an image or video captured by a camera 102 positioned on the exterior of the vehicle 100 when an motion sensor 506 in the vehicle 100 detects that the vehicle 100 is moving in a particular way (e.g., moving uphill or moving over a bumpy road) or when a weight sensor 512 in the vehicle 100 detects that a rear passenger is present in the vehicle 100. A rear passenger may also control the rear display 106. For example, the rear passenger may select a particular camera 102 on the vehicle, and an image or video captured by the selected camera 102 may be presented on the rear display. The rear passenger may also provide input that causes a camera 102 on the vehicle 100 to capture an image (e.g., take a photograph). Furthermore, the rear display 106 may present navigation information to the rear passenger. For example, when the vehicle 100 detects a form of input (e.g., the rear passenger asking "are we there yet?"), the vehicle 100 may present on the rear display 106 information about the vehicle's 100 location (e.g., where the vehicle 100 is and how far the vehicle 100 is from its destination). In this manner, the vehicle 100 provides enhanced rear display 106 capabilities that are unavailable in existing vehicles.

FIG. 9A illustrates an example computer system 900. Computer system 900 may include a processor 902, memory 904, storage 906, an input/output (I/O) interface 908, a communication interface 910, and a bus 912. Although this disclosure describes one example computer system including specified components in a particular arrangement, this disclosure contemplates any suitable computer system with any suitable number of any suitable components in any suitable arrangement. As an example and not by way of limitation, computer system 900 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 900 may include one or more computer systems 900; be unitary or distributed, span multiple locations, machines, or data centers; or reside in a cloud, which may include one or more cloud components in one or more networks. Where appropriate, computer system(s) 900 may perform, at different times or at different locations, in real time or in batch mode, one or more steps of one or more methods described or illustrated herein.

Processor 902 may include hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. Processor 902 may include one or more internal caches for data, instructions, or addresses.

In particular embodiments, memory 904 includes main memory for storing instructions for processor 902 to execute or data for processor 902 to operate on. In particular embodiments, one or more memory management units (MMUs) reside between processor 902 and memory 904 and facilitate accesses to memory 904 requested by processor 902. In particular embodiments, memory 904 includes random access memory (RAM). This disclosure contemplates any suitable RAM.

In particular embodiments, storage 906 includes mass storage for data or instructions. As an example and not by way of limitation, storage 906 may include a removable disk drive, flash memory, an optical disc, a magneto-optical disc, magnetic tape, or a Universal Serial Bus (USB) drive or two or more of these. Storage 906 may include removable or fixed media and may be internal or external to computer system 900. Storage 906 may include any suitable form of non-volatile, solid-state memory or read-only memory (ROM).

In particular embodiments, I/O interface 908 includes hardware, software, or both, providing one or more interfaces for communication between computer system 900 and one or more input and/or output (I/O) devices. Computer system 900 may be communicably connected to one or more of these I/O devices, which may be incorporated into, plugged into, paired with, or otherwise communicably connected to vehicle 100 (e.g., through the TCM ECU). An input device may include any suitable device for converting volitional user input into digital signals that can be processed by computer system 900, such as, by way of example and not limitation, a steering wheel, a microphone (e.g., microphones 508), a user interface (e.g., user interface 510, such as a touch screen interface, associated with front display 104 and/or rear display 106, a joystick, a scroll wheel, a button, a toggle, a switch, a dial, or a pedal). An input device may include one or more sensors for capturing different types of information, such as, by way of example and not limitation, motion sensor 506, sensors 512, and cameras 102 described above. An input device may also include location system 514 or other data sources described in the embodiments herein.

An output device may include devices designed to receive digital signals from computer system 900 and convert them to an output format, such as, by way of example and not limitation, speakers, headphones, a display (e.g., front display 104, rear display 106, etc.), a heads-up display, a lamp, a smart vehicle accessory, another suitable output device, or a combination thereof. This disclosure contemplates any suitable I/O devices and any suitable I/O interfaces 908 for them. I/O interface 908 may include one or more I/O interfaces 908, where appropriate.

In particular embodiments, communication interface 910 includes hardware, software, or both providing one or more interfaces for data communication between computer system 900 and one or more other computer systems 900 or one or more networks. Communication interface 910 may include one or more interfaces to a controller area network (CAN) or to a local interconnect network (LIN). Communication interface 910 may include one or more of a serial peripheral interface (SPI) or an isolated serial peripheral interface (isoSPI). In some embodiments, communication interface 910 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 912 includes hardware, software, or both coupling components of computer system 900 to each other. Bus 912 may include any suitable bus, as well as one or more buses 912, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

FIG. 9B illustrates example firmware 950 for one or more vehicle ECUs as described with respect to control system 502. Firmware 950 may include functions 952 for receiving (through communication interface 910) and processing video captured from cameras 220 Firmware 950 may include functions 954 for receiving contextual data from one or more of motion sensor 506, microphones 508, user interface 510, sensors 512, location system 514, etc. Firmware 950 may include functions 956 for identifying a context based on the contextual data. Firmware 950 may include functions 958 for displaying an image (e.g., on the front display 104 or rear display 106). Displaying an image may include displaying an image from the captured video based on the identified context or presenting navigation information (e.g., on the front display 104 or rear display 106). Firmware 950 may belong to one or more vehicle ECUs.

The descriptions of the various embodiments of the present disclosure have been presented for purposes of illustration. Many modifications and variations will be apparent to those of ordinary skill in the art without departing from the scope and spirit of the described embodiments.

The terminology used herein was chosen to explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure may exceed the specific described embodiments. Instead, any combination of the features and elements, whether related to different embodiments, is contemplated to implement and practice contemplated embodiments. Furthermore, although embodiments disclosed herein may achieve advantages over other possible solutions or over the prior art, the embodiments may achieve some advantages or no particular advantage. Thus, the aspects, features, embodiments and advantages discussed herein are merely illustrative.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Certain types of storage devices that include these mediums include: diskette, hard disk, random access memory (RAM), read only memory (ROM), erasable programmable read only memory (EPROM or Flash memory), static random access memory (SRAM), compact disc read only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, refers to non-transitory storage rather than transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but the storage device remains non-transitory during these processes because the data remains non-transitory while stored.

While the foregoing is directed to embodiments of the present disclosure, other and further embodiments may be devised without departing from the basic scope thereof, and the scope thereof is determined by the claims that follow.

What is claimed is:

1. A system comprising:
   a plurality of cameras comprising a first camera positioned on an exterior of a vehicle, the first camera configured to capture a first video;
   a front display integrated into the vehicle and positioned proximate to a driver's seat;
   a rear display integrated into the vehicle and positioned between the driver's seat and a rear passenger seat; and
   at least one processor including instructions that, when executed, cause the at least one processor to:
      identify a first context of the vehicle or a rear passenger;
      provide, on the rear display and based on the first context, a first image from the first video;
      identify a second context of the vehicle, the second context comprising motion data indicating at least one of: (i) that the vehicle is turning left or right while the vehicle is driving along a surface or (ii) that the vehicle is traveling over an uneven surface;
      select, based on the second context, second video from a second camera of the plurality of cameras for display on the rear display, the second camera positioned on the exterior of the vehicle, the second camera configured to capture a second video; and
      provide, on the rear display, the second video from the second camera.

2. The system of claim 1, wherein:
   the first context is identified based at least in part on the motion data, and
   the first context relates to movement of the vehicle.

3. The system of claim 2, wherein the first camera is selected from the plurality of cameras based on the first context.

4. The system of claim 1, further comprising:
   a weight sensor positioned in the rear passenger seat; and
   a motion sensor that detects movement of the vehicle, wherein the first context is identified based at least in part on (i) the weight sensor detecting the rear passenger and (ii) the detected movement, wherein the instructions further cause the at least one processor to turn on the rear display based on the first context.

5. The system of claim 1, wherein the first context is identified based at least in part on user input, and wherein the first camera is further configured to capture the first image based on the first context.

6. The system of claim 1, wherein the first context is identified based at least in part on a detected location of the vehicle, wherein the instructions further cause the at least one processor to instruct the first camera to capture the first image based on the first context.

7. The system of claim 6, wherein the plurality of cameras further comprises a third camera positioned in an interior of the vehicle, and wherein the instructions further cause the at least one processor to instruct the third camera to capture a second image when the first camera captures the first image.

8. The system of claim 1, wherein the instructions further cause the at least one processor to provide, on the rear display, an indication of how far the vehicle is from a destination.

9. The system of claim 1, wherein the instructions further cause the at least one processor to provide the first video on the front display.

10. The system of claim 1, wherein selecting the second video from the second camera comprises selecting video from a side camera of the plurality of cameras for display on the rear display based on the second context indicating that the vehicle is turning left or right while the vehicle is driving along the surface.

11. The system of claim 1, wherein selecting the second video from the second camera comprises selecting video from a front-facing camera of the plurality of cameras for display on the rear display based on the second context indicating that the vehicle is traveling over the uneven surface.

12. A method comprising:
capturing, by a first camera of a plurality of cameras of a vehicle, a first video, wherein the first camera is positioned on an exterior of the vehicle;
identifying, by at least one processor, a first context of the vehicle or a rear passenger;
providing, based on the first context, a first image from the first video on a first rear display integrated into the vehicle and positioned between a driver's seat and a rear passenger seat, wherein the vehicle comprises a front display integrated into the vehicle and positioned proximate to the driver's seat;
identifying a second context of the vehicle, the second context comprising motion data indicating at least one of: (i) that the vehicle is turning left or right while the vehicle is driving along a surface (ii) that the vehicle is traveling over an uneven surface;
selecting, based on the second context, second video from a second camera of the plurality of cameras for display on the rear display, the second camera positioned on the exterior of the vehicle, the second camera configured to capture a second video; and
providing, on the rear display, the second video from the second camera.

13. The method of claim 12, further comprising selecting the first camera from the plurality of cameras based on the first context, wherein the first context is identified based at least in part on the motion data.

14. The method of claim 12, wherein one or more views of the plurality of cameras displayed on the rear display are based on the first context, wherein the first context is identified based at least in part on the motion data.

15. The method of claim 12, further comprising:
detecting, by a motion sensor, movement of the vehicle; and
turning on, by the at least one processor, the rear display based on the first context, wherein the first context is identified based at least in part on (i) a weight sensor positioned in the rear passenger seat detecting the rear passenger and (ii) the detected movement of the vehicle.

16. The method of claim 12, further comprising capturing, by the first camera, the first image based on the first context, wherein the first context is identified based at least in part on user input.

17. The method of claim 12, further comprising:
detecting, by the at least one processor, a location of the vehicle, wherein the first context is identified based at least in part on the detected location of the vehicle; and
instructing, by the at least one processor, the first camera to capture the first image based on the first context.

18. The method of claim 17, further comprising instructing, by the at least one processor, a third camera of the plurality of cameras to capture a second image when the first camera captures the first image, wherein the third camera is positioned in an interior of the vehicle.

19. The method of claim 12, further comprising providing, by the at least one processor and on the front display, an indication of how far the vehicle is from a destination.

20. A non-transitory computer readable medium storing instructions that, when executed by at least one processor, cause the at least one processor to:
instruct a first camera of a plurality of cameras to capture a first video, wherein the first camera is positioned on an exterior of a vehicle;
identify a first context of the vehicle or a rear passenger;
provide, on a rear display integrated into the vehicle and positioned between a driver's seat and a rear passenger seat and based on the first context, an image from the first video, wherein the vehicle comprises a front display integrated into the vehicle and positioned proximate to the driver's seat;
identify a second context of the vehicle, the second context comprising motion data indicating at least one of: (i) that the vehicle is turning left or right while the vehicle is driving along a surface (ii) that the vehicle is traveling over an uneven surface;
select, based on the second context, second video from a second camera of the plurality of cameras for display on the rear display, the second camera positioned on the exterior of the vehicle, the second camera configured to capture a second video; and
provide, on the rear display, the second video from the second camera.

* * * * *